United States Patent [19]
Chae et al.

[11] 3,757,943
[45] Sept. 11, 1973

[54] ELECTRONIC SYSTEM AND METHOD FOR CAPSULE INSPECTION

[75] Inventors: Hi Chul Chae; Richard Gelinas; Jon Caton Trusty; Walter H. Berntsen, all of Indianapolis, Ind.

[73] Assignee: Eli Lilly and Company, Indianapolis, N.Y.

[22] Filed: Sept. 27, 1971

[21] Appl. No.: 183,948

[52] U.S. Cl. ............... 209/111.7, 356/197, 356/198, 356/240
[51] Int. Cl. ........................................... B07c 5/342
[58] Field of Search ............ 356/196–198, 239, 240; 209/111.7, 72, 73, 74, 75, 111.6

[56] References Cited
UNITED STATES PATENTS
2,633,772   4/1953   Brown ................................ 356/197
3,217,877   11/1965  Honjyo ............................ 209/111.7
3,528,544   9/1970   Noguchi ............................. 356/197

Primary Examiner—Richard A. Schacher
Attorney—Verne A. Trask et al.

[57] ABSTRACT

An electronically controlled system and method for processing the signals obtained from an optical inspection of rapidly presented and rotated medicinal capsules. Built-in deviations in the capsule structure are differentiated from structural defects which may occur and the decision made to accept or reject each capsule. The occurrence of a defect or a built-in deviation causes photo detectors to have a current spike output. Both the defect and the built-in deviation spikes are converted to digital pulses. The defect pulses are counted and the deviation pulses are used to reset a free-running oscillator controlled counter. A defect in the circumferential vicinity of the built-in deviations causes the built-in deviation counter to be prematurely reset. This causes a defect to be recorded. Each capsule is redundantly examined. A sufficient number of reoccurrences of any defect causes a shift register to be activated which initiates and controls the rejection of the capsule. Optical readouts present the number of rejected and accepted capsules, and the percentage of rejected capsules for each lot of 1,000 capsules which are inspected.

39 Claims, 18 Drawing Figures

Patented Sept. 11, 1973    3,757,943

Patented Sept. 11, 1973　　3,757,943
9 Sheets-Sheet 3
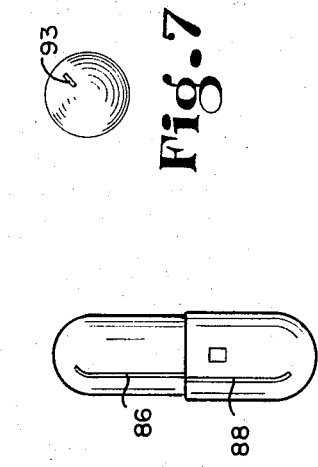
Fig.-7
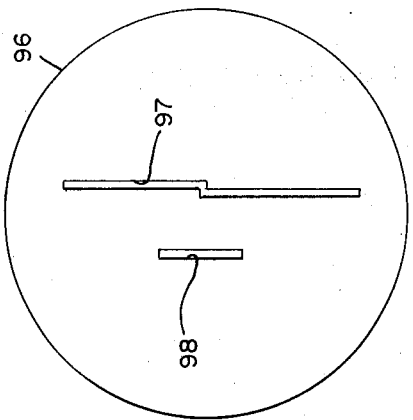
Fig.-8
Fig.-9
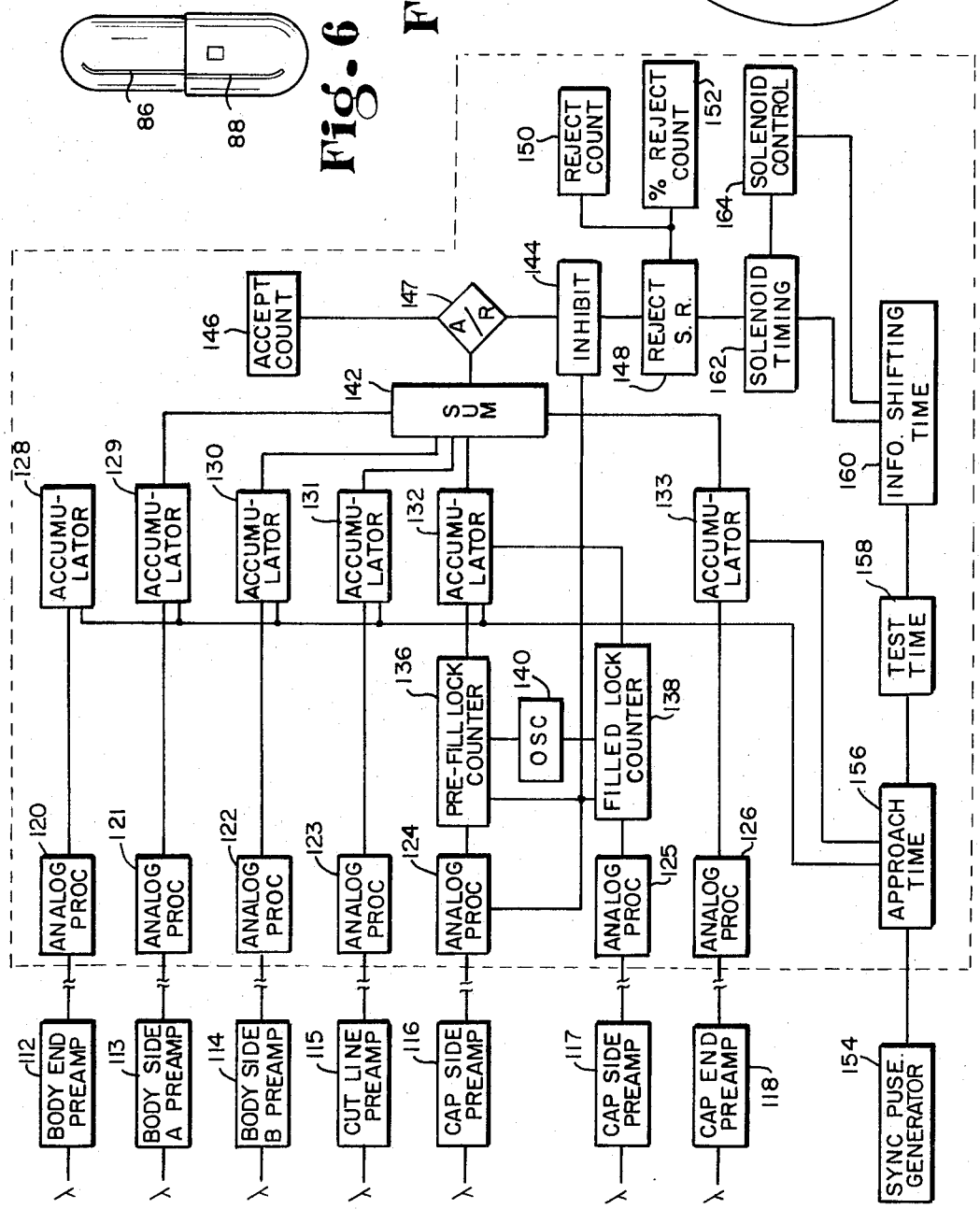
Fig.-6
Fig.-10

Patented Sept. 11, 1973 3,757,943

ELECTRONIC SYSTEM AND METHOD FOR CAPSULE INSPECTION

BACKGROUND OF THE INVENTION

This invention relates to an electronic system and method for processing and utilizing signals obtained from the optical inspection of large numbers of medicinal capsules. The capsules are rapidly and successively presented for inspection in a predetermined location at which each capsule is spun on its axis to expose its entire surface for inspection.

Medicinal capsules are made in large quantities from gelatin or other materials. The capsules consists of a cap and body which are telescopically fitted together. The capsule cap must receive, surround and engage the capsule body with sufficient tightness to retain the telescoped assembly during handling. The empty capsules are normally supplied in bulk to automated filling machines where the caps and bodies are disengaged, the bodies filled with a medicinal material, usually in granular or powder form, and the capsules reassembled.

The capsules must be free of virtually all imperfections to avoid impairing the operation of the filling machines, to avoid improper dosages of the medicinal material and to avoid the production of imperfect filled capsules.

The requisite meticulous inspection of the capsules prior to filling has heretofore been effected by visually inspecting the capsules as they move in a single thickness layer across an illuminated screen. This technique is very costly and not effective to the desired degree.

The visual inspection relies on the light transmitted through the capsules and the acuity of the observers as the capsules are conveyed before them. Opaque or darkly colored capsules are particularly difficult to effectively inspect using this method. Furthermore, the observers cannot maintain close scrutiny for any extended periods of time with any appreciable degree of efficiency. The capsule defects must be of a reoccurring variety or they will not be readily detected. A particularly defective lot of capsules requires two and possibly three inspections to achieve the requisite quality level. Even then, many defective capsules are not detected.

Inspection must also take account of deviations built into the capsules for special purposes. In some capsules, a pair of diametrically opposed bosses may be formed in the side wall of the caps near their open ends for retaining the empty capsule assemblies. Also, a set of circumferentially-spaced inwardly raised lands may be provided in the caps to retain the filled capsule assemblies. The use of such lands is disclosed in Hostetler et al., U.S. Pat. No. 3,173,840 of Mar. 16, 1965 entitled Separation-Resistant Capsules. The surface deviations produced by such lands and bosses are similar to some defects.

The present invention provides an effective electronic system for processing and utilizing the electrical signals obtained from a comprehensive optical inspection of a high number of rapidly presented medicinal capsules. The processed signals are used to make the differentiation between a "good" and "bad" capsule. The system is applicable to transparent as well as translucent or opaque capsules. It is also applicable to capsules having surface deviations resulting from planned internal bosses and lands or other detectable planned deviations.

The electronic system and method of this application are especially adapted for use with an apparatus for conveying and inspecting capsules as described in a copending application to Wagers, et al., U.S. Ser. No. 105,262. The apparatus described therein provides means to rapidly present a large number of capsules for complete inspection purposes. The present invention provides a method and electronic control means compatible with such an apparatus for processing and utilizing electrical signals which signify the presence of a defect or deviation in a capsule, produced as in the copending application of Willard J. Vandenberg et al., Ser. No. 183,199, filed Sept. 23, 1971.

SUMMARY OF THE INVENTION

In accordance with the invention, capsules may be loaded onto a moving conveyor as the conveyor passes through a loading hopper supplied directly from a capsule making machine. The capsules may then be uniformly oriented, i.e., with either the cap forward or the body forward, by means described in detail in the above mentioned copending application of Wagers et al. Capsules may be transferred after orientation to an inspection head comprised of a circumferential series of closely spaced spinning parallel rolls. Each pair of these rolls forms a capsule-supporting groove. The grooves may be connected to a vacuum source which aids in supporting the capsules therein as it is spun. The inspection head may be indexed through successive stationary positions to move the capsules from the transfer position to an inspection position and thereafter to a reject position and an accept position if found acceptable.

The side, shoulder and end area of the spinning capsule may be inspected in the inspection position through the use of a common or separate optical systems which illuminate the entire capsule surface. The capsule presents a smooth convex reflective surface to directed light from the optical system which produces specular reflection from that surface over glare areas which can vary in shape and definition depending both on the shape of the capsule and on the shape of the light beam with which it is illuminated.

A lens system is focused on the spinning capsule, and utilizes a series of light sensors which are responsive to light in different portions of a substantially linear area spaced from the glare areas. One or more of these sensors may be used to examine the ends of the capsule and the sides of the cap and body, and to examine any portion of the cap or body which may contain built in deviations.

The light sensors, being arranged to sense light image areas spaced from the glare areas, are responsive to both increases and decreases in light. They will detect decreases in diffuse light due to black spots, holes and the like spinning through this observed image area. Also, and especially, they will detect increases in light caused by specular reflection from defects such as bubbles, crimps and the like which produce abrupt changes in the convex reflective surface of the capsule.

Photo sensitive cells may be used as a major component of the light sensors to create an electrical signal variation each time the light in the respective image area increases or decreases abruptly. Preferably, this electrical signal is in the form of a current spike. The occurrence of one such spike during each revolution of the capsule is taken as sufficient to cause rejection of the capsule. However, where a built-in deviation is to pass through a given light sensor image area, the built-in spikes must be separated and distinguished from the defect caused spikes. Preferably, the time interval between spikes is measured and compared with the time interval which should occur between built-in spikes for a "good" capsule. The determination of any inequality during each revolution of the capsule is taken as sufficient to cause its rejection.

The photo cell outputs may be taken in parallel and processed to control digital functions or may be taken successively by a scanning technique wherein the output of each photocell is taken for a discrete amount of time. In the preferred embodiment, the photocell outputs are amplified and shaped for effective parallel presentation to the logic portion of the system. The photocell outputs corresponding to image areas of the capsule in which there are no built-in deviations may each be connected to a defect counter which increases in count each time a defect causes an increase or decrease in the image area ight. The number of times which each capsule is inspected is determined by the number of times it is spun by its holding rolls before the inspection head indexes.

The outputs of the defect counters may be respectively connected to a like number of binary switches in an accumulating system. The output of any of these switches changes if a predetermined minimum count is reached by the counter associated therewith. This threshold count is adjustable and preferably corresponds to the number of times the capsule is spun during inspection minus one. For example, if the capsule is spun five times in the inspection station and a defect is present on its surface, the defect will be detected five times. The counters should reach a count of five. The binary switches in this instance are preferably set to four to ensure that the defect will be observed without requiring that it be detected during each rotation of the capsule. A change in the output of any of the binary switches signifies that a defect has been detected on the capsule.

The output of each of the shaping and amplifying circuits associated with the built-in boss or land detecting photocells may be coupled to the resetting input of an individual counter, e.g., a four stage decade counter forming part of an accumulator. These counters are arranged to count the number of pulses emitted by a free running oscillator. The shaped and amplified photocell output is used to reset these counters to zero when a built-in deviation or a defect is detected. Adjustable binary switches may be coupled to the output of these counters and adjusted or set to correspond to the number of oscillator pulses which should be counted in the interval between the occurrences of the regular irregularities, i.e., the built-in deviations. The binary switches will not have an acceptable output if the counters are reset by a photocell output prior to reaching the desired count thereby signifying that a defect has been detected. The output of this portion of the analyzation logic may then be used as an input to the same type of accumulating counter and binary switch combination used for the rest of the photocell outputs.

A true signal on the output of one of the defect counter binary switches which signifies that a defect has been detected, may be applied to a reject position shift register and to a reject counter. The shift register is clocked each time a capsule to be inspected is indexed into the inspection position which moves any such true signal from the binary switch one bit position within the register. The output from this register may be taken from any particular bit position which corresponds to a subsequent position of the inspection head. This output, when true, may be used to operate an air valve control to reject a defective capsule.

A false signal on the output on the binary switches signifies an acceptable capsule. This signal may be used to trigger an accept counter.

In the preferred embodiment, all of the above processing is synchronized with the indexing and spinning inspection head roller pairs by a synchronizing pulse. This pulse may be obtained by interrupting the light falling on a photo-transistor each time a radially extended arm mounted on and spinning with the inspection head rotary drive shaft comes between the photocell and a positioned light source. The synchronizing pulse is serially applied preferably to a series of monostable multivibrators, each having its own output time constant. The output of these multivibrators may be used to regulate the time needed for the capsule to enter the inspection area, be inspected and depart.

A second control signal may be taken from one of the photocell output shaping circuits which process the built-in deviation signals to inhibit any reject signals resulting from the absence of a capsule on a pair of inspection rollers in the inspection area.

The accept and reject signals may also be processed to provide a numerical output corresponding to the percentage of capsules rejected with respect to the total number of capsules inspected. This may be done by summing the reject and accept signal outputs and using the result to clock a four stage decade counter. The output of this counter may then be used to initiate the reading of the contents of a second counter which counts the number of rejects only. If this is done when the first counter reaches a count of one hundred or any multiple of ten thereof, the number read from the reject counter will be the percentage of rejects of the even number of capsules inspected with appropriate placement of the decimal point. Various modifications may be made to provide alarm means when any predetermined maximum reject percentage is surpassed.

Circuitry may also be provided which can actuate a warning device when any expected signal, such as a synchronization pulse or a multivibrator output is not present when it should be. This permits the stopping of the machine before an inordinate number of capsules are erroneously rejected or accepted due to the failure of that signal.

BRIEF DESCRIPTION OF THE DRAWINGS

The accompanying drawings illustrate the invention and, by way of example, show a preferred embodiment of the invention. In such drawings.

Figure 11:
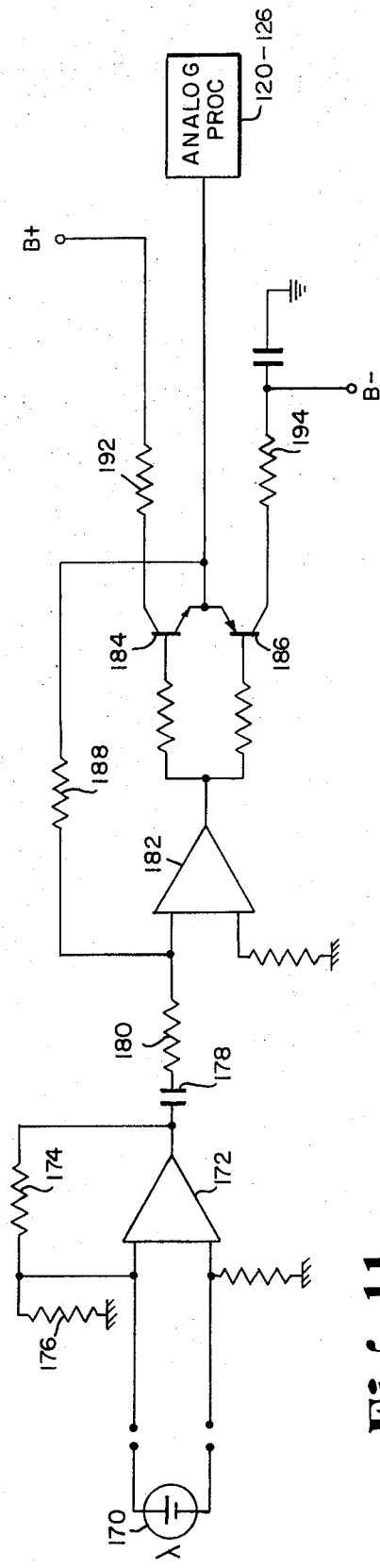
Figure 12:
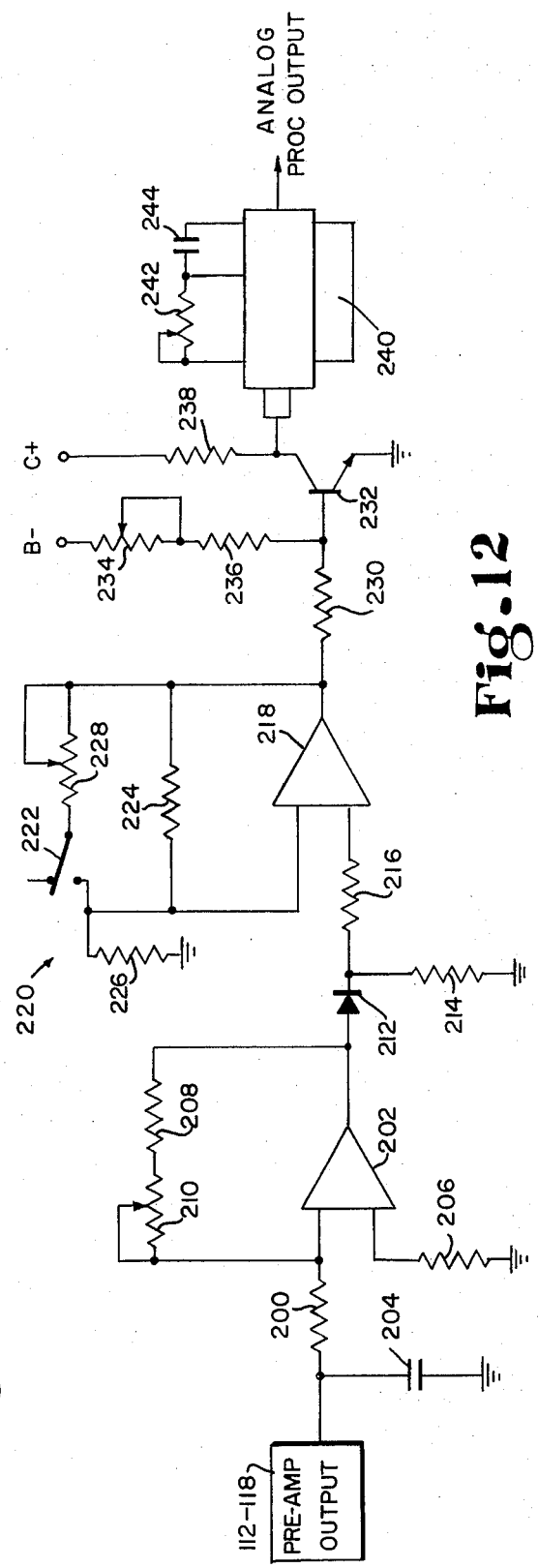
Figure 13:
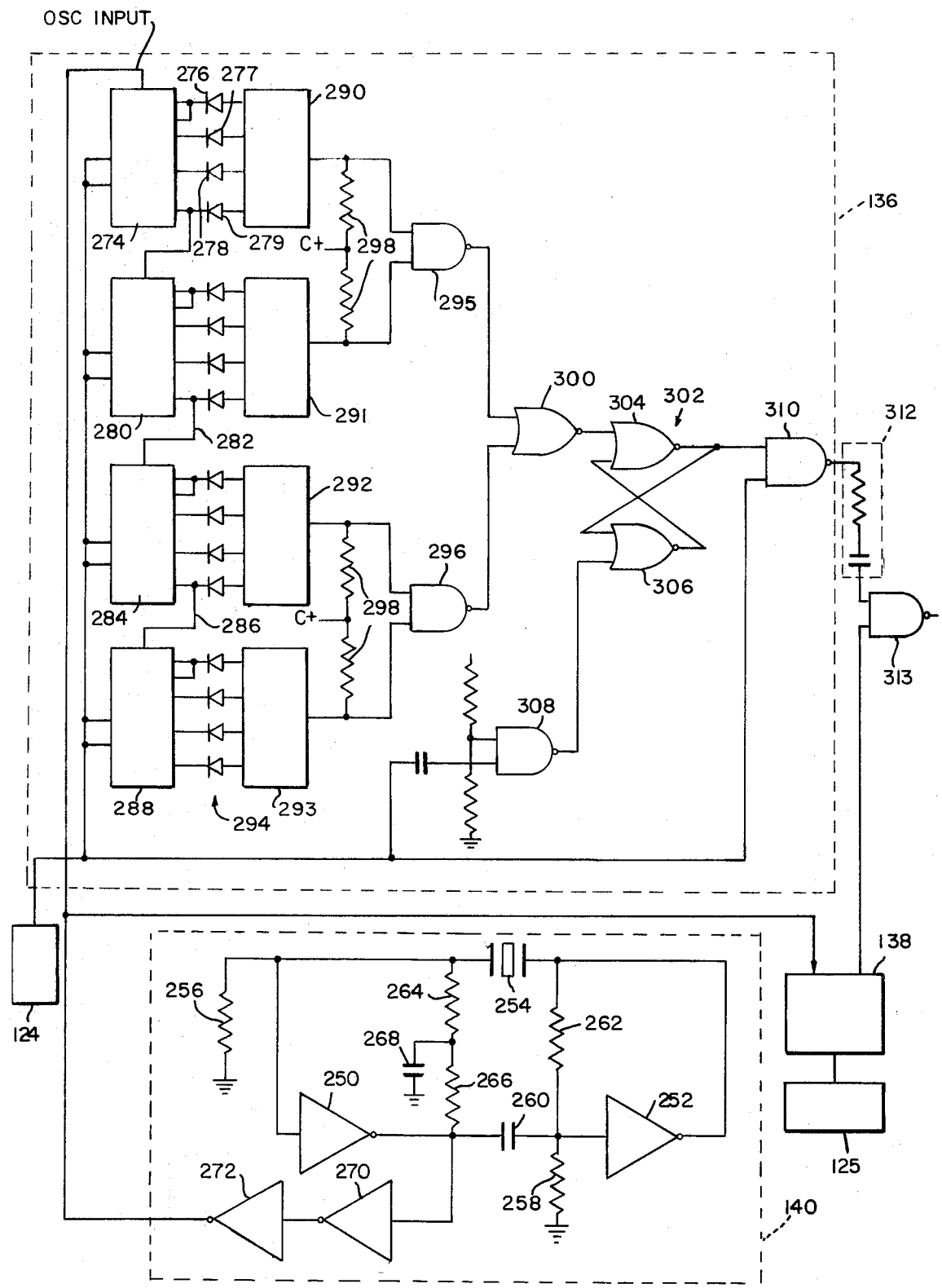
Figure 14:
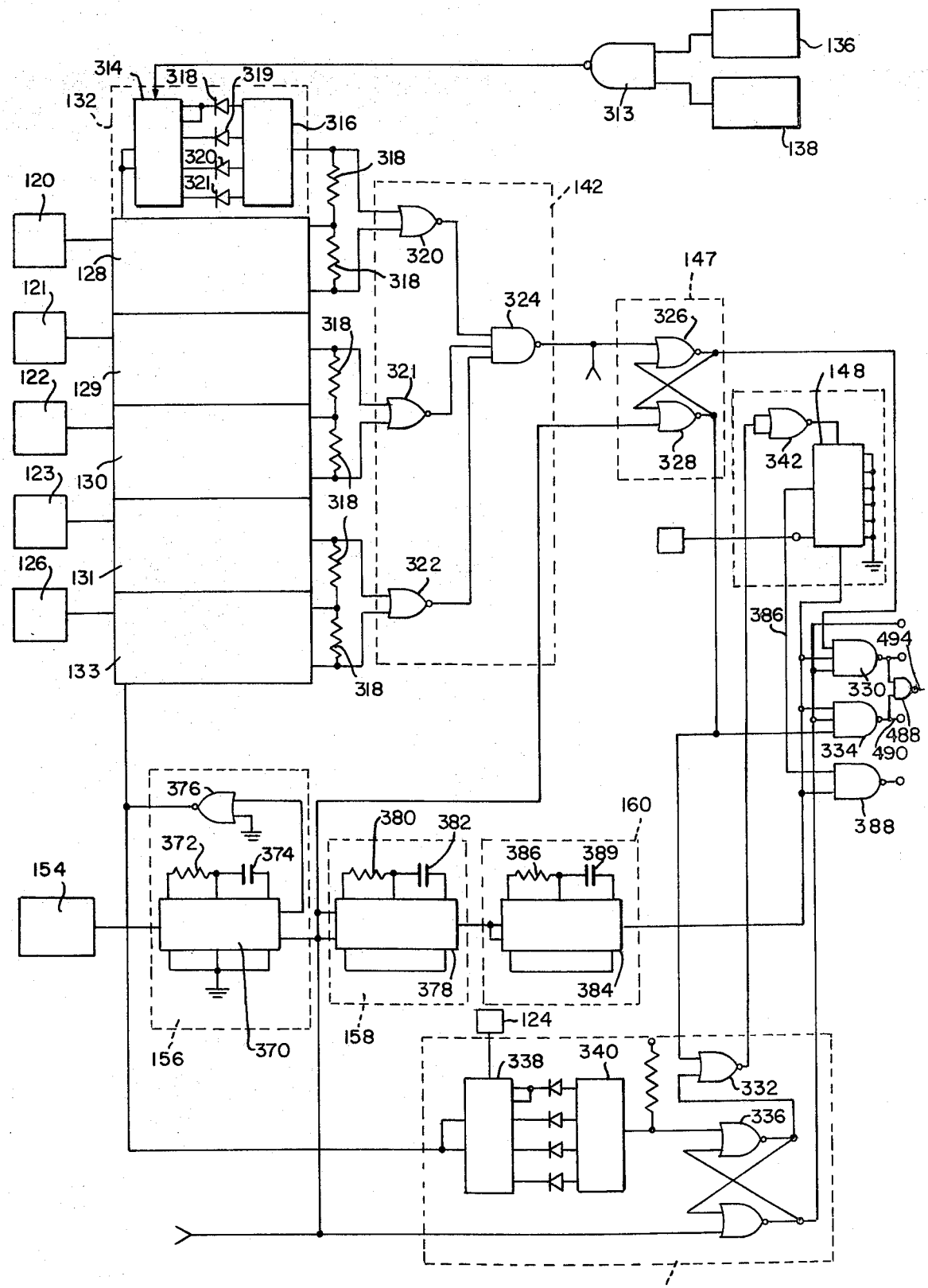
Figure 16:
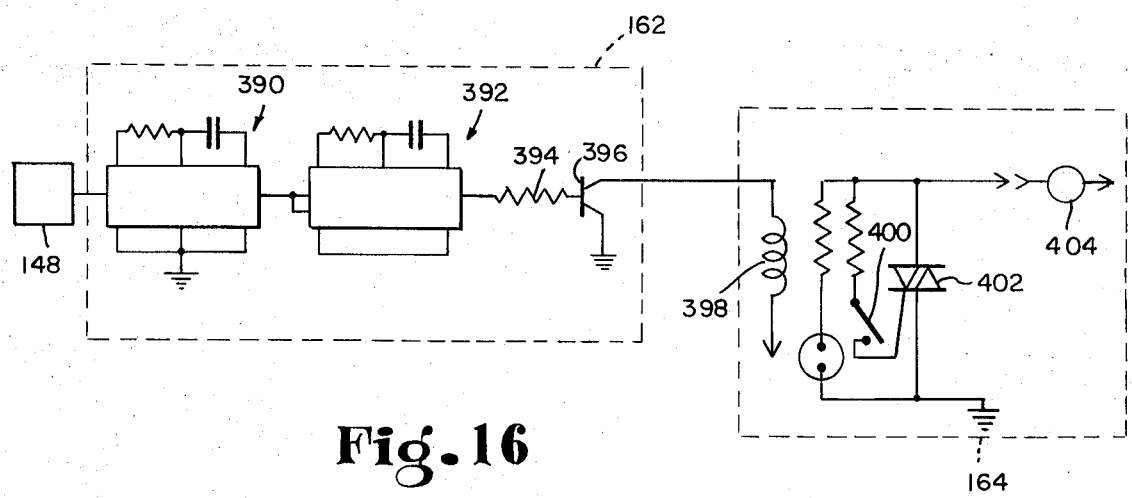
Figure 15:
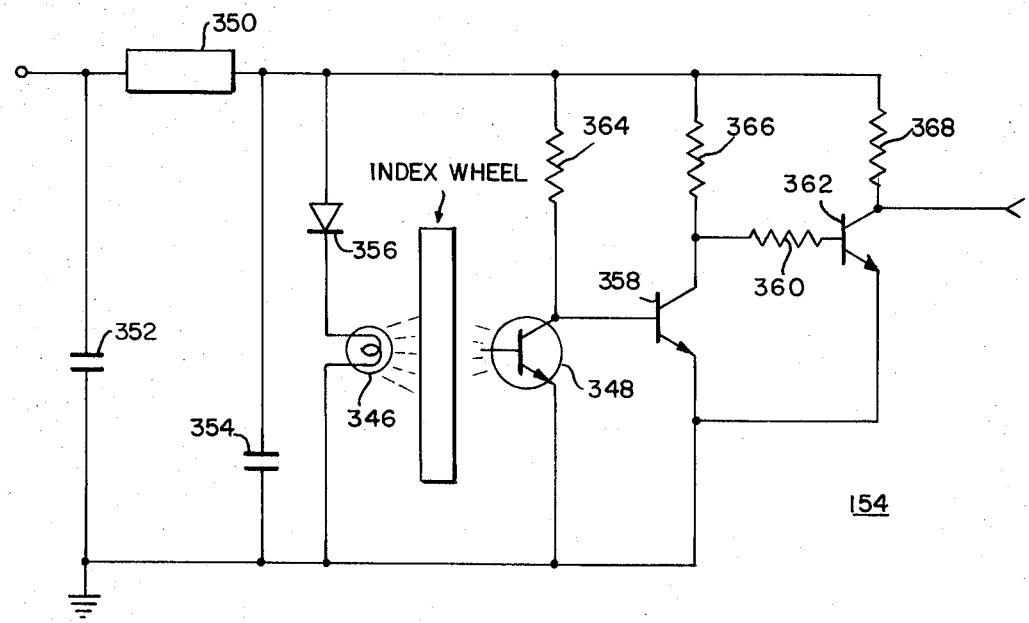
Figure 17:
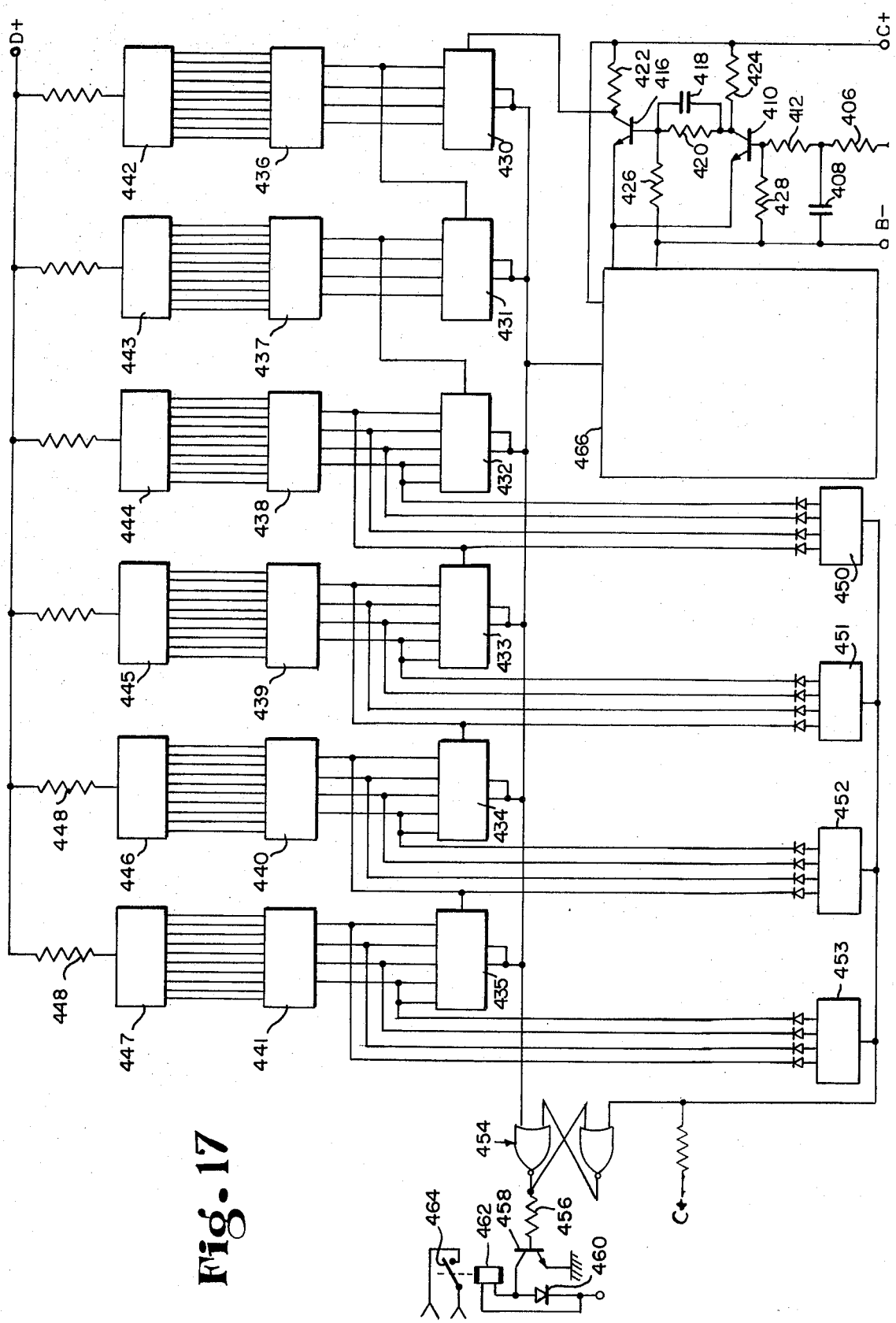

38. An 5 is a diagram of the optical inspection apparatus;

FIG. 6 is a side elevation of a capsule showing the side glare areas;

FIG. 7 is an end view of a capsule showing the end glare area;

FIG. 8 is a view of the image area mask for the end inspection;

FIG. 9 is a view of the image area mask for the side inspection;

FIG. 10 is a block diagram of the preferred embodiment of the present invention;

FIG. 11 is a schematic diagram showing one of the photocells and pre-amplifier circuits;

FIG. 12 is a schematic diagram showing one of the shaping and amplifying circuits;

FIG. 13 is a schematic diagram showing one of the built-in deviation detector circuits;

FIG. 14 is a schematic diagram showing the circuit for processing the signals obtained from the circuits of FIG. 12 and 13;

FIG. 15 is a schematic diagram showing the synchronizing pulse generator circuit;

FIG. 16 is a schematic diagram of the reject mechanism control circuit;

FIG. 17 is a schematic diagram of the accept counter circuit; and

Figure 18:
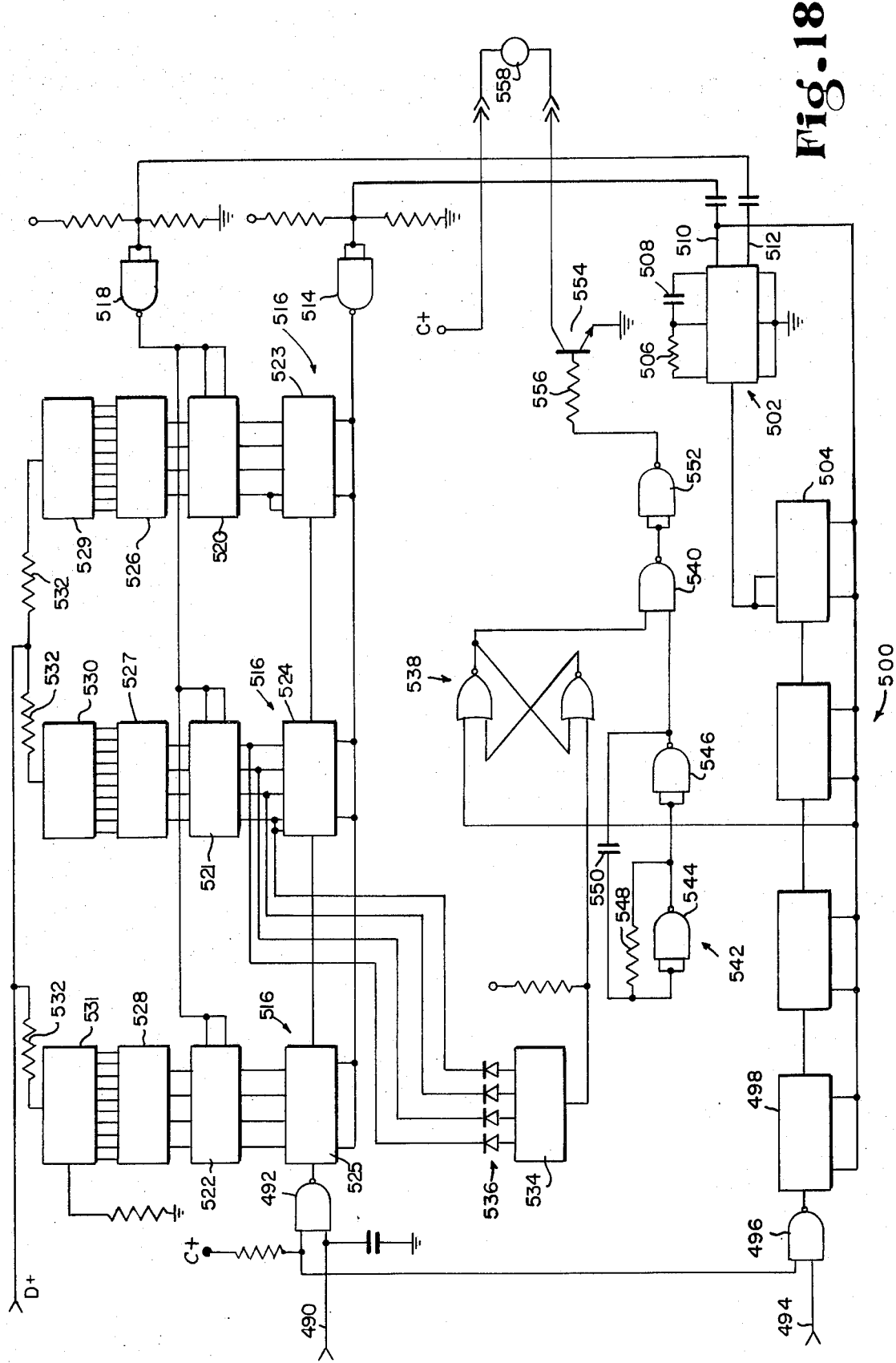

FIG. 18 is a schematic diagram of the rejected capsule ratio counter circuit.

DETAILED DESCRIPTION OF THE PREFERRED EMBODIMENT

Figure 1:
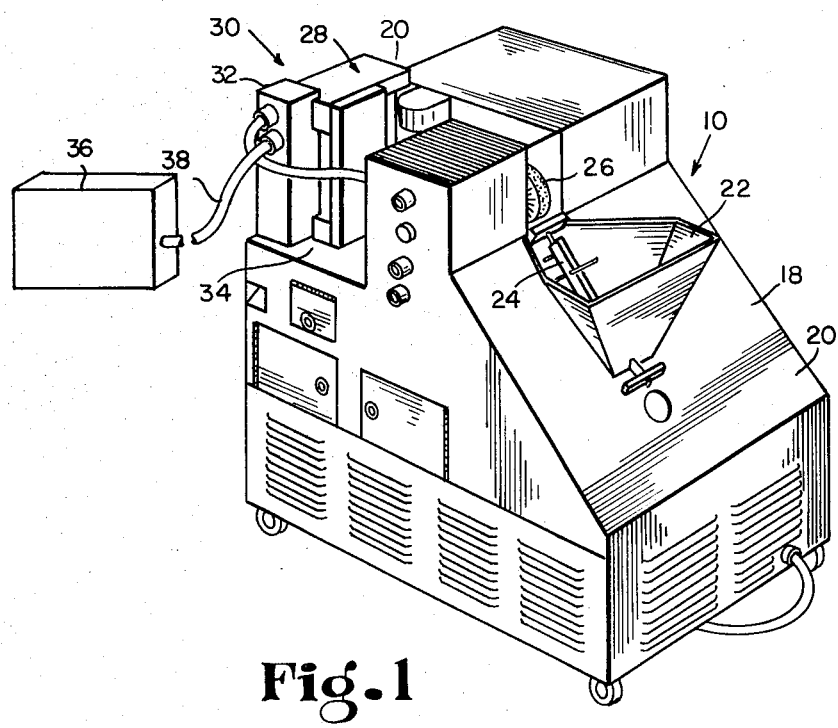
FIG. 1 is a perspective view of a machine for supplying capsules in sequence at high feed rates to an indexing inspection head.
Figure 2:
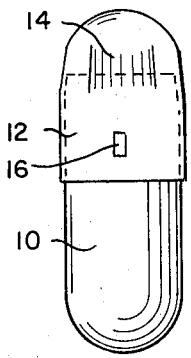
FIG. 2 is a side elevation of one type of capsule to be inspected in the machine of FIG. 1.

The capsule sorting machine shown in FIG. 1 is used for the inspection of conventional medicinal capsules. These capsules, with reference to FIG. 2, normally consist of a body 10 and a cap 12, each having a generally cylindrical side wall and a rounded end. The cap is preferably of the type shown in Hostetler et al., U.S. Pat. No. 3,173,840. This particular type of cap has three wide built-in deviations or lands 14 near its closed end to interlock with the body portion 10 when the capsule is assembled after being filled with medicinal material. In addition, or alternatively, the cap may have two or more built-in side deviations or bosses 16 near its open end to interact with the body in retaining the capsule assembly when empty.

The sorting machine shown in FIG. 1 comprises a housing 10 enclosing a lower drive compartment 18 and an upper compartment 20 which contains the driven inspection mechanism. The housing has a sloping rear wall 20 which lies below a feed hopper 22 for a conveyor 24. The conveyor runs upward on an incline through the bottom of the hopper 22, beneath a brush 26 forming a part of a rectifying mechanism, and then to a transfer wheel 28 by which capsules are transferred to an inspection head 30. An optical inspection module 32 is mounted opposite the inspection head 30 on a platform 34. The module 32 contains the optical inspection and capsule illuminating system together with a plurality of photocells and preliminary amplification means for the output of each photocell. This module will be described hereinafter in more detail.

The optical inspection module 32 is connected to a remote electronic logic module 36 by a cable 38. The pre-amplification of the photocell outputs in the optical inspection module 32 permits the location of the logic module at a substantial distance from the main sorting machine.

Figure 3:
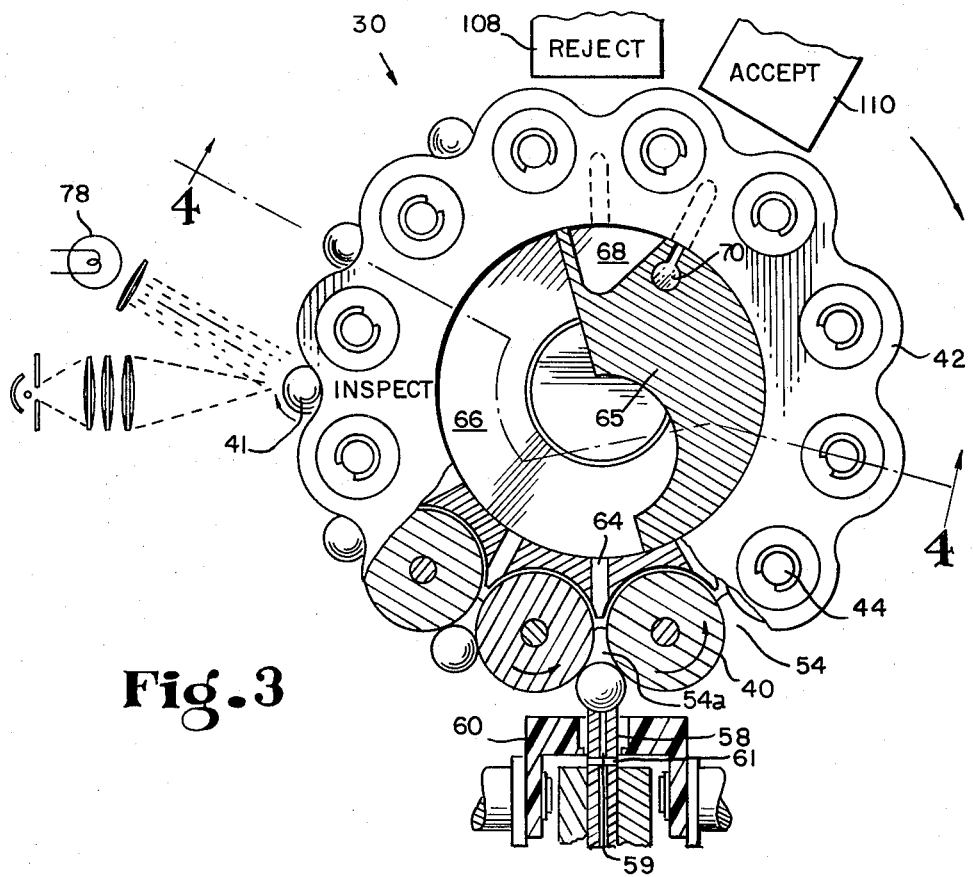
FIG. 3 is a plan view, with parts broken away, of the inspection head, with an optical inspection system shown diagrammatically.
Figure 4:
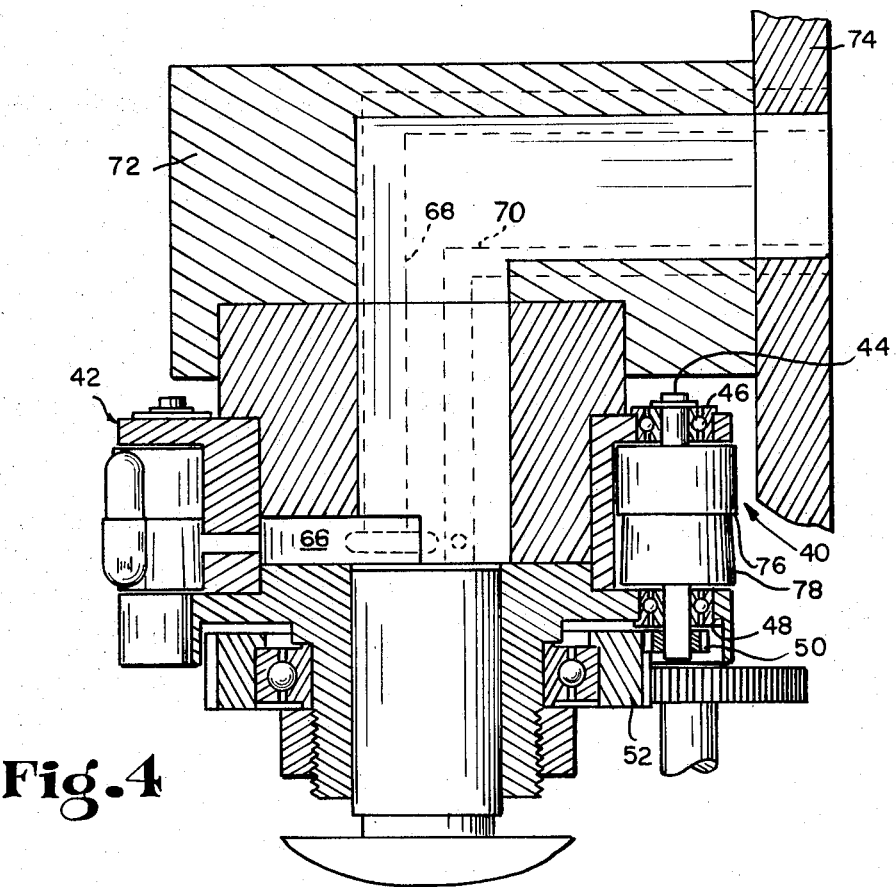
FIG. 4 is a vertical section on the line 4—4 of FIG. 3.

The inspection head 30 is shown in more detail in FIG. 3 and 4. A circular series of twelve capsule-spinning rolls 40 are mounted about the periphery of a carrier 42. Each of the rolls 40 is mounted on a shaft 44 which is mounted at either end in ball bearings 46 and 48 in the carrier 42. The lower end of each shaft 44 carries a gear 50 in mesh with a ring gear 52 for spinning the rolls.

Each pair of rolls 40 forms a capsule receiving groove 54. Capsules are placed in these grooves as the grooves are indexed past the transfer mechanism 28. Capsules are carried to the transfer position within a bucket 60 but are supported on a supporting plunger 58 which has an air passage 59 communicating with a vacuum supply (not shown). The lower end of the plunger 58 rides on a cam (not shown) which pushes the plunger out to the position shown in FIG. 3 as the capsule carrying bucket 60 passes into the transfer position. The air passage 59 is opened to the atmosphere through a valving passage 61 when the plunger is in the outward position. This releases the capsule from the supporting plunger.

Each of the grooves 54 communicates through an air passage 64 with the hollow interior of the roll carrier 42. A valve block 65 is seated within this hollow and contains a main vacuum chamber 66, a control vacuum chamber 68 and an air passage 70. Each of these are connected to separate vacuum and air passages within a manifold 72 which is fixed to a supporting wall 74 and holds the valve block 65 stationary within the inspection head 30.

When the capsule is released from its plunger 58 in the transfer position, it will be accepted in the groove 54a. Air flow in the groove will seat and support the capsule against the spinning rolls. These rolls 40 may be provided with a downward facing shoulder 76 and conical bottom portion 78 to assist the positioning of the capsule. The capsule is held against the spinning rolls 40 by vacuum passing through the air passage 64 and positions itself with the flared edge of its cap against the roll shoulder 76.

The main vacuum chamber 66 maintains vacuum through each of the passages 64 as the capsule-containing grooves index from the loading station, through three subsequent indexing steps and at the inspection station shown at the left in FIG. 3. At the inspection station, the capsule 41 is held in the groove 54 between the rolls 40 and is rapidly rotated on its axis in a fixed position to expose its entire surface for inspection.

Preferably, each capsule is rotated at least five times at the inspection station, but this can be varied to accommodate any number of inspection redundancies. For example, the inspection head must be indexed 600 times per minute through 30° indexing movements to present its 12 grooves 54 to the loading station for an inspection rate of 600 capsules per minute. In this instance, the rolls may have a full speed spinning rate of approximately 2400 rpm, which gives the capsules a spinning rate on the order of 6000 rpm. This allows about 10 revolutions of the capsule per indexing cycle of the inspection head and about 6 revolutions during the dwell of each cycle, which permits accurate inspection with an adequate number of redundancies.

Figure 5:
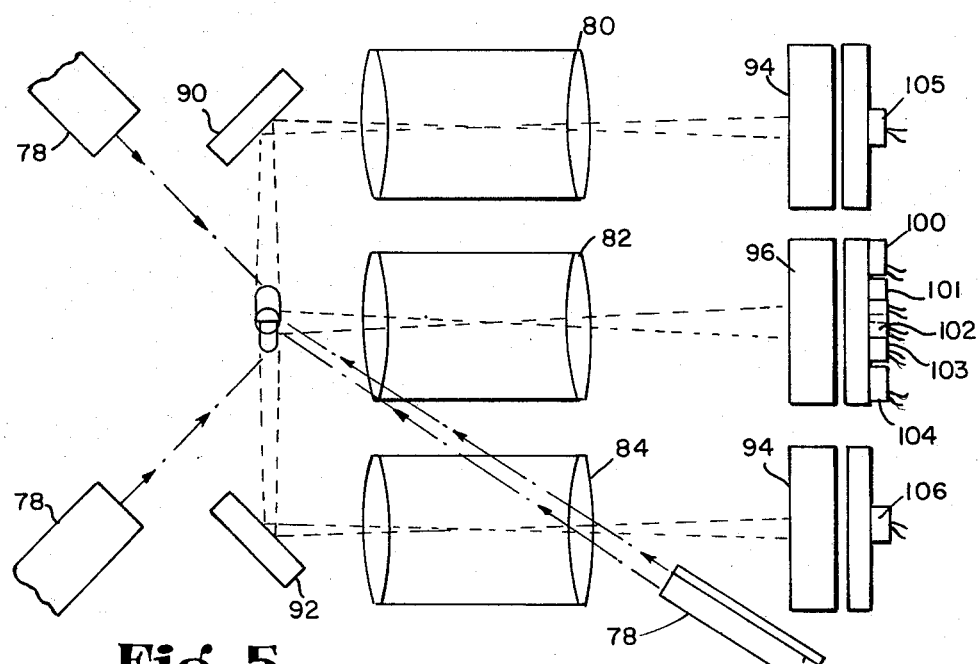

The actual inspection of the capsule may be done optically, by means indicated diagrammatically in FIG. 3 and shown in more detail in FIG. 5. The optical inspection means comprises one or more light sources 78 to illuminate the spinning surface of the capsule. The illuminated surface is observed through three scanning lenses 80, 82 and 84. The smooth surface of the capsule causes the light to be specularly as well as diffusely reflected therefrom. The resulting glare area, as it would appear to an observer looking through the middle lens 82, is shown in FIG. 6. The glare area 86 on the body portion of the capsule is slightly offset from the corresponding area 88 on the cap portion. This offset is caused by the difference in outer diameter of the cap and body which causes the illuminating light to be reflected from a slightly different radial position.

The top 80 and bottom 84 lenses in FIG. 5 observe the specular reflection on the ends of the cap and body respectively. They are focused on their respective ends through mirrors 90 and 92 so that all of the receiving lenses 80, 82 and 84 may be located in the same plane. The specular reflection as seen by the two end scanning lenses is shown in FIG. 7 and comprises a small elongated rectangular area 93.

An optical mask is located behind each of the side and end scanning lenses 80, 82 and 84. These masks are shown in FIG. 8 and 9. Photocells are located behind these masks and observe an image area on the capsule only through narrow apertures which have been cut in the optically black surface of the mask. The viewed image areas are spaced from the glare areas and located generally parallel thereto. The masks 94 for scanning the ends of the capsule have apertures 98 which generally describe a Y-pattern. The side scanning mask 96 has an aperture 97 which is of the same shape as the specular line 86 on the side of the capsule. This mask also has an aperture 98 for observing the capsule in the vicinity of the bottom edge of the cap. This bottom edge in conventionally referred to as the cut line of the cap.

There are a plurality of photocells 100–104, preferably five, which are positioned behind and look through the side scanning aperture 97. The end apertures have one photocell 105 and 106 associated with each.

The masks 94 and 96 are positioned behind their respective lenses 80 and 84, 82 to view an area of the capsule adjacent the specularly reflected areas. Nothing is detected by the photocells 100–101 and 104 to 106 if the capsule is free of surface defects. However, a defect, such as a minute dust particle or mashed spot etc., will change the light in the image area as the defect passes through the glare and image areas. This abrupt change in image area light is detected by the respective photocell 100 to 101 and 104 to 106 which transforms it into a proportional electrical current spike. Each capsule, as heretofore mentioned, is preferably spun five times in the inspection position. The highspeed at which the capsule is spun, i.e., 6000 rpm, makes these redundancies extremely desirable.

The two photocells 102 and 103 which are positioned to look at the sides of the cap of the capsule will detect the presence of the built-in lands and bosses in addition to any defects. These photocells 102 and 103 do not, and cannot, distinguish between a defect and a regular irregularity such as a land. The discrimination is done within the control logic circuitry as will hereinafter be explained.

From the inspection station, each capsule is carried through two successive idle stations at which the capsule holding groove 54 is continuously connected through its air passage 64 to the main vacuum chamber 66 of the valve block 65. The air passage 64 is carried out of communication with the main vacuum chamber 66 as the inspection head moves to the next, or reject, station and is brought into communication with the control chamber 68. This chamber 68 is supplied with a vacuum to retain the capsule if the capsule has been found acceptable by the control logic, but is supplied with a compressed air blast if the capsule has been found unacceptable. The compressed air, when applied, passes through the air passage 64 and ejects the capsule from its supporting groove into a reject chute 108. If found acceptable, the capsule is retained on its supporting rolls and indexes with them to the accept station. The air passage between the rolls 64 then communicates with the air passage 70 which is continuously supplied with air to eject the capsule into an accept chute 110.

A block diagram is shown in FIG. 10 illustrating in block form the electronic control logic system contained in the electronic logic module 36. The output of each of the photocells shown in FIG. 5 is applied directly to a preliminary amplifier 112 to 118. These amplifiers increase the magnitude of the low amplitude current spike emanating from the photocells to enable the remainder of the electronic control logic to be located at a remote location.

Each of the pre-amplifier outputs is applied to an analog processor 120 through 126. The incoming signals are amplified within the analog processors and shaped for use by the digital logic components that follow. It is within the processors that the decision is made as to whether each defect is above a preselected level. Any incoming signal which is determined to be below the amplitude level required for that of an ascertainable defect is eliminated.

The outputs of the analog processors 120–123 and 126 which are associated with the body end of the capsule, the body side, the cut line and the cap end are each applied directly to an adjustable digital accumulator 129–131 and 133. The two analog processor outputs 124 and 125 associated with the cap side inspection are applied to counters 136 and 138. The caps of the capsule, as will be recalled, contain the lands and bosses for maintaining the capsule assembly both prior to and after filling the capsule with medicinal material. The optical inspection system, however, treats these locking indentations as defects. The inputs from the optical system with respect to the cap must be discriminately judged to distinguish between these built-in deviations and actual defects.

The outputs of the analog processors 124 and 125 are applied to the reset inputs of their associated counters 136 and 138. These counters count the oscillation pulses from a free running oscillator 140.

The built-in bosses for locking the cap and body in assembled condition prior to the filling of the capsule preferably occur every 180° of capsule rotation. The lands which retain or lock the capsule in assembled form after filling and which are located closest to the closed end of the cap each preferably extend about 90° and are located symmetrically about the circumference of the cap adjacent its closed end. The speed of rotation of the capsule is known, as is the frequency of the free running oscillator 140 so that the number of oscillator pulses expected to occur in between occurrences of the built-in deviations may be determined.

The counters 136 and count the number of oscillator pulses and are reset only by an output from a respective analog processor 124 and 125 signifying that a defect or built-in deviation has been noted on the capsule cap by the optical system. The counters are set to give a predetermined output only when a predetermined count is reached. This count is equal to the number of oscillator pulses expected before the detection of a land or boss resets a respective counter. If a defect occurs, the counter will be prematurely reset before reaching the predetermined count and a defect-indicating output will occur. These outputs are accumulated in an accumulator 132. The outputs from the other analog processors 120–123 and 126 are accumulated in separate accumulators 128–131.

Each of the accumulators is set to yield a true output if a predetermined level of count has been reached. As has heretofore been mentioned, each of the capsules is preferably examined a total of five times. It has been found to yield excellent results if the accumulators are set for a total count level for four, thereby permitting a defect to go undetected once during the five rotations to allow for errant signals without affecting the sensitivity of the test procedure.

The outputs of the accumulators are summed together in a summer 142 so that for the remainder of the circuitry only one output is used.

A false output on each of the accumulators and subsequently a false output on the summer 142 signifies that an acceptable capsule has been found. The count in an accepted capsule counter 146 is increased by one by an accept/reject decision block 147. If, however, one of the accumulators 128–133 has a true output the decision to reject the capsule is made by the decision block 147, but the reject signal is inhibited until a boss has been detected by one of the cap side analog processors 124. This inhibit is used to ensure that a complete capsule is in the inspection position so that subsequent counters will not be given erroneous signals. Absent such an inhibit, a signal is then applied to a reject position shift register 148 which determines at which of the subsequent index stations of the inspection head the capsule will be rejected. The reject signal is also applied to a reject counter 150 to increase the count of rejected capsules by one.

The accepted capsule signals and the rejected capsule signals are also applied to a percentage reject logic section 152 which provides a continually updated readout of the percentage of capsules which are rejected with respect to the number of capsules inspected.

The entire logic section processing must be closely synchronized with the indexing of the inspection head. This is especially true because of the high rate of inspection which is taking place. The synchronization is done by using a synch pulse generator which is activated by the rotation of the inspection head indexing shaft. The output from this generator 154 is used to initiate a three part time interval comprised of an approach time section 156, a test time section 158 and an information shifting time section 160.

The output of the approach time section 156 is applied to the accumulators 128 through 133 to inhibit their operation during the time needed for a new capsule to be indexed into the inspection position. The expiration of the approach time, signified by another output from the approach time section 156 initiates the test time interval. The test time section 158 applies a signal to the information shifting section 160 when the test interval expires.

It is not until the information shifting time section has been initiated that a defective capsule may be rejected by the reject position shift register 148. During this time the reject position shift register is able to pulse a timing solenoid 162 which initiates the reject control 164. The reservation of the mechanical reject function until the information shifting time is reached eliminates any detrimental electronic noise which might be injected into the digital logic system by the energization of the reject control mechanism. This noise is avoided by inhibiting the actuation of such control apparatus until a time when no logic decisions are being made.

The actual circuitry for the photocells and preamplifiers is shown in FIG. 11. This circuitry is identical for each of the photocells and amplifiers 112 through 118 of FIG. 10. The terminals of the photocell 170 are connected in a differential mode to the input terminals of an operational amplifier 172. The gain of this amplifier is determined by the ratio of a feed back resistor 174 to a grounded input resistor 176. The output of the operational amplifier 172 is coupled through a capacitor 178 and resistor 180 to the input of a second operational amplifier 182. The second operational amplifier 182 drives a complementary pair of transistors 184 and 186. The output of this transistor pair is taken from a common emitter connection. This connection is also coupled through a feed back resistor 188 to the input of the second operational amplifier 182. The other input terminal of the second operational amplifier 182 is grounded through a resistor 190. The transistors 184 and 186 are biased through resistors 192 and 194 from a regulated B+ and B− voltage supply, respectively.

The preamplifier section imparts sufficient power gain to the photocell output to enable the remaining electronic functions to be performed at a station remote from the actual sorting machine to avoid problems in the digital logic circuits with electrical noise.

The output of each of the preamplifiers 112 through 118 is connected to an analog processor 120 through 126, the circuitry for one of which is representative and is shown in FIG. 12. The preamp output is coupled through an input resistor 200 to one input of an operational amplifier 202. The input side of this resistor 200 is also grounded through a low pass filter capacitor 204. The other input of the operational ampliifer 202 is connected to ground through a resistor 206. Feedback is provided through the serial connection of a resistor 208 and a potentiometer 210. The gain of the operational amplifier 202 is determined by the ratio of the sum of the feedback resistances 210 and 208 to the input resistance 200. The potentiometer 210 provides gain adjustment.

The output of the operational amplifier 202 is supplied to a half-wave rectifier comprised of a diode 212 and resistor 214. The output of the half-wave rectifier is applied across an input resistor 216 to a second operational amplifier 218 whose output is connected to the remaining input of the amplifier through a resistive feedback network 220. One branch of this network 220 has selector means 222 for selecting a high or a low gain configuration. With the selector 222 in the high position, the feedback consists of a resistor 224 connected from the input to the output of the amplifier 218 and a second resistor 226 connected from the input to ground. With the gain selector switch in the low position, an adjustable gain potentiometer 228 is connected in parallel with the first feedback resistor 224.

The output of the second operational amplifier 218 is connected through a resistor 230 to the base electrode of a switching transistor 232. The series combination of an adjustable potentiometer 234 and a resistor 236 is also connected to the base electrode of this transistor 232. The opposite end of the serial combination is connected to the B− voltage supply for adjusting the threshold point of the transistor 232. Biasing is provided through a biasing resistor 238 from a C+ voltage supply. The output of the transistor 232 is applied to a monostable multivibrator, or one-shot 240.

The output of the one-shot 240 is always at the same amplitude and lasts for a predetermined interval of time. This interval is determined by the RC time constant of a resistor 242 and capacitor 244 connected to and forming a part of the one-shot 240. The pulse width is normally about 0.5 to 1.0 milliseconds in duration.

The output of the analog processors 120 through 126, as above described, comprises a series of square waves with the individual pulses corresponding on a one for one basis to defects or locking lands or bosses which have been detected on the surface of the capsule. The outputs of the processors 120, 126 and 121–123 associated with the two ends of the capsule, the side of the body of the capsule and cut edge of the cap are applied directly to accumulators 128, 133, 129, 130 and 131 for compilation. The output of the analog processor 124 which is associated with the portion of the cap having the locking bosses thereon is applied to a counter 136 and to an inhibit circuit 144. The inhibit circuit will be described below in conjunction with the accumulators 128 through 133.

In a similar manner, the output of the analog processor 125 associated with the portion of the cap having the filled capsule locking lands on it is applied to a second counter 138. The circuitry for these two counters 136 and 138 is shown in FIG. 13 with that of the oscillator 140. The circuitry for the pre-filled capsule locking boss counter 136 will be used as representative of both.

The oscillator 140 is crystal controlled and is comprised of two hex inverters 250 and 252 and an oscillating crystal 254. The crystal 254 is used to maintain a high degree of stability in the frequency of oscillation. Each of the inverters 250 and 252 has an input resistor 256 and 258. The two inverters are coupled together through a capacitor 260. One of them has a feedback resistor 262 connected from its output and one side of the crystal oscillator to its input.

The input of the other inverter 250 is connected to the crystal oscillator and to one side of a serial connection of a pair of feedback resistors 264 and 266. The other side of the latter resistor is connected to the output of the hex inverter 250. A by-pass capacitor 268 connects the common lead between these feedback resistors 264 and 266 to ground. In practice, the DC resistor feedback path for both inverters is approximately equal, but due to the by-pass capacitor 266 the AC resistive feedback path of one inverter 250 is approximately equal to one-half of that of the other 252.

The output of the oscillator is taken from the output of the inverter 250 having the reduced AC feedback resistance and applied serially to two inverting amplifiers 270 and 272 for shaping the oscillation wave form.

The shaped oscillatory signal is coupled directly to the "clock" input of a binary coded decimal counter 274 in the boss counter 136. Each time the counter 274 receives a pulse from the oscillator 140 its count is increased by one.

The outputs from this BCD counter 274 are presented, as they occur, on output lines 276 through 279. The The first output line 276 has a numerical weight of $2^0$; the second 277 a counting weight of $2^1$; the third 278 has a counting weight of $2^2$; and the last line 279 has a counting weight of $2^3$. By way of example, when the counter 274 has received five pulses from the oscillator 140 there will be a true output on the first line 276 and the third line 278, i.e., $2^0 + 2 = 5$.

This process continues until a count of nine has been reached in which event there will be a true output on the first output line 276 and the last output line 279. The latter line 279 is connected to the clock input of a second BCD counter 280. This BCD counter 280 is clocked by the trailing edge of a true signal which is applied to it. It can be seen that the only time that a true signal is removed from the last output line 279 of the first counter 274 is when the first counter 274 has received a tenth clock pulse. The removal of the true signal from the last output line 279 of the first counter 274 thereby clocks the second counter 280. In terms of normal addition, a carry of one to the tens place has been performed.

The second counter 280 operates in the same way as the first counter 274, i.e., giving a binarily coded decimal output which increases by one each time the counter is clocked. The last output line 282 from the second counter 280 is connected to the clock input of a third counter 284 and clocks that counter when the second counter 280 has received its tenth clock pulse. In similar fashion, a fourth counter 288 is clocked once each time a signal is removed from the last output line 286 on the third counter.

Each of the BCD counters 274, 280, 284 and 288 is coupled to a binary switch 290 through 293, respectively. More specifically, each of the outputs of the counters is connected to the cathode of a diode 294 whose anode is connected to an input on a corresponding BCD switch. Each of these switches 290 through 293 has a range of settings from 0 to 9 so that only when the decimal equivalent of the binary combination of inputs equals the number to which the switch is set does the switch yield a true output. For example, if the first and third output lines of the first counter 274 have a true signal on them, the decimal equivalent, as explained above, is five. Only if the BCD switch 290 associated with that counter 274 is set for five will the switch have a true output. If the switch, were set on the number nine, and the input lines were the equivalent of a decimal five, there would be a false output signal.

The output from the analog processor 124 for the prefilled capsule locking bosses is coupled to the reset input of each of the BCD counters 274, 280, 284 and 288. A true output signal from the analog processor 124 will reset all of these counters to zero. The oscillator 140, being free running, will immediately cause the counters to start counting again. This resetting, assuming that at least one of the BCD switches was not originally set at zero, causes at least that one of the BCD switches to yield a false output signal.

The outputs of the first two BCD switches 290 and 291 are connected to the inputs of a NAND gate 295.

The other two BCD switches 292 and 293 have their outputs connected to the input of a second NAND gate 296. Both inputs of each of these NAND gates must be true before the output will go false. If either of the inputs goes false the output will go true. A resistor 298 connects each of the BCD switch outputs to the C+ voltage supply for proper biasing of their output.

The two NAND gate outputs are connected to the input of a NOR gate 300. This gate will have a true output only if both of its inputs go false. The NOR gate 300 is connected to the input of a flip-flop 302 which is comprised of two interconnected NOR gates 304 and 306. The output of this flip-flop 302 will remain false unless one of the BCD switches 290 to 293 has a false output in which case the output of the flip-flop 302 will go true. The bottom NOR 306 of the flip-flop has a resetting input which is connected to the output of a time delay NAND gate 308 which in turn is also coupled to the output of the pre-filled capsule locking boss analog processor 124.

The output of the flip-flop 302 is connected to a NAND gate 310 which has its other input connected to the boss detecting analog processor 124. The output of the NAND gate 310 is coupled through a clamping circuit 312 to the input of another NAND gate 313. The other input of the latter NAND gate 313 is supplied from the analogous circuitry of the land detecting counter 138.

In operation, the BCD switches 290 through 293 are each set so that collectively they represent a four digit decimal number. This number corresponds to the number of oscillator pulses which will occur in between the appearance of locking bosses on a spinning capsule. The counters 274, 280, 284 and 288, assuming a good capsule, will only be reset by the analog processor 124 when a boss is detected. Each of the counters will presumably have reached the count needed to place a true output on its corresponding BCD switch. These true signals will be inverted by the NAND gates 294 and 296 and applied to the NOR gate 300 which will invert these signals once again. The output of the flip-flop 302 will be false so that the output of the first of the single NAND gates 310 will be true. This true signal, when applied to the second single NAND gate 313 will produce a false output thereby signifying that only the built-in bosses and no defects were found.

In the case of a defective cap, one or more of the counters will be unable to reach the predetermined count, as they will be reset by the analog processor defect signal. The resulting false counter output will result in a true signal from the last single NAND gate 313.

The output of the NAND gate 313 which sums the outputs of the two land detection counters 136 and 138 is applied to an accumulator 132 shown in FIG. 14. It should be recalled that the only time when this accumulator 132 receives a clock input is when a defect other than the built-in deviation has occurred. Analogous to this, the output of each of the analog processors 120 through 123 and 126 which are only associated with the processing of defect signals is applied to an accumulator 128 through 131 and 133. Only one of the accumulators 132 will be described in detail as each of the accumulators 128 through 133 is identical.

The accumulator is comprised of a binary coded decimal counter 314 and a binary coded decimal switch 316. The input in each instance is applied to the clock input of the BCD counter 314 and the count in the counter increases by one each time such an input pulse is received. The four output lines 318 through 321 are binarily weighted with values of $2^0$ to $2^3$. The binary switch 316 can be set, by means of a shorting bar, to any desired number from zero to nine. The switch 316 will yield a true output only when the number to which the switch has been set is surpassed by the counter 314.

In operation, each capsule, as previously mentioned, is preferably inspected five times. A defect should be detected and its resulting signal processed a total of five times. Each time the defect is detected the counter 314 in the accumulator increases its count by one. In such instance, the BCD switch 316 would be set to 4 or 5. This insures that a defect must be detected at least 4 or 5 times before the BCD switch 316 will yield a true output signifying a rejectable capsule.

The output signals from the accumulators 128 through 133 are applied to the summer 142. Each of the outputs is also coupled to a supply voltage C+ through a resistor 318 for proper biasing.

The accumulator outputs are applied in pairs 128 and 132, 129 and 130, and 131 and 133, to three NOR gates 320 through 322 in the summer. The outputs of the NOR gates 320 through 322 are applied to a NAND gate 324 which has a false output if the outputs of all the accumulators are false. This means, in terms of the capsule inspection, that a defect was not detected the requisite number of times for the accumulator to signal for its rejection.

The output of the summer 142 is applied to the accept/reject decision block 147. More specifically, the block comprises a flip-flop formed by interconnecting two NOR gates 326 and 328. The first of these NOR gates 326 controls the acceptance count and the latter controls the reject count and process.

The output from the acceptance NOR 326 is connected to one input of a NAND gate 330. This NAND gate 330 has two other inputs, the origin of which will be described below.

The lower NOR gate 328 in the accept/reject decision block 147 controls controls the rejection of a Its Its output is connected to a NOR gate 332 in the inhibit block 144 and to a NAND gate 334 which controls the reject counter 150. This NAND gate 334 has two other inputs which are in common with the remaining two inputs of the accept counter control NAND 330.

The NOR gate 332 in the inhibit block has an inhibit input from the output of a flip-flop 336. This flip-flop 336 is controlled by a BCD counter 338 and switch 340 combination. The clock input to this counter 338 is connected to the output of the prefilled capsule locking boss analog processor 124. The flip-flop 336 is set by the BCD switch 340 when the number of pulses corresponding to the number set in the switch 340 has been attained by the BCD counter 338. Until this occurs, an inhibit is held on the NOR 336 to stop further processing of the reject signal. This inhibit insures that the reject counter and control apparatus will not function from erroneous information which might occur, as for instance when a capsule is not on the pair of rolls in the inspection position.

Once a prefilled capsule locking boss has been detected, any reject signal from the accept/reject decision flip-flop will pass through the gating NOR 332 and then through an inverting NOR 342. The output of this NOR 342 is applied to the input of the reject position shift register 148. This shift register 148 is clocked by a signal originating from the synch pulse generator 154 which synchronizes the mechanical rotation of the inspection head with the electronic processing.

The electronic configuration of the synch pulse generator 154 is shown in FIG. 15. A lamp 346 shines continuously on a photo-transistor 348. Current is supplied to the lamp 346 from a closely regulated power supply comprised of a voltage regulator 350, two capacitors 352 and 354 and a diode 356. The output of the phototransistor 348 is directly coupled to an amplifying transistor 358. The transistor 358 in turn is DC coupled through a resistor 360 to a second and output transistor 362. All three transistors 348, 358, and 362 are biased from the regulated power supply by resistors 364, 366, and 368, respectively.

The lamp 346 and photo-transistor 348 are physically positioned such that an arm extending from the driving shaft of the inspection head 30 (FIG. 3) interrupts the light falling on the photo-transistor 348 each time the drive shaft makes one revolution. The pulse created by this interruption is amplified by the two transistors 358 and 362 and is applied to the input of a monostable multivibrator 370 in the approach time block 156 (FIG. 10 and 14). The output pulse width of this multivibrator 370 is determined by the RC time constant of a resistor 372 and a capacitor 374. The RC constant is set to be of a sufficient duration to allow the inspection head to index and position a capsule for inspection. The output of this multivibrator 370 is inverted by a NOR gate 376 whose output is applied to all of the accumulators 128 through 133 to reset the BCD counters and prepare them for an inspection cycle.

Another output of the approach time multivibrator 370 is applied to the accept/reject flip-flop 147 and to the inhibit flip-flop 336 to reset these devices. This output of the approach multivibrator 370 is also applied to the test time block 158 of FIG. 10.

The test time block 158 comprises a monostable multi-vibrator 378 whose output pulse width is determined by the RC time constant of a resistor 380 and capacitor 382. The time constant determined by this resistor and capacitor 380 and 382 defines the time period during which the capsule is being tested. The operation of an information shifting time multivibrator 384 is initiated by the expiration of the output of the test time multivibrator 378. The information shifting time multivibrator has an output with a duration corresponding to the time constant of a resistor 386 and a capacitor 389 which must be long enough for shifting information from the accumulators 128 to 133 to the counters 146 and 150 and reject shift registers 148, e.g., approximately 80 micro-seconds.

The output of the information shifting multivibrator 384 controls several functions. This output supplies the remaining input to the accept counter NAND gate 330 and the reject NAND gate 334 and thereby permits th appropriate count to take place during the shifting time. The shifting time multivibrator is also used to clock the reject position shift register 148. A true signal, as will be recalled, is applied to this shift register when a defective capsule has been detected and the appropriate output obtained from the accept/reject flip-flop 145. This true signal advances one bit position in the shift register 148 each time the information shifting time period occurs since the information shifting time multivibrator 384 clocks the shift register. The output of the shift register can be taken from any bit position which corresponds to the subsequent indexed position of the inspection head where the physical rejection of the defective capsule is to take place.

By way of example, assume the defective capsule is to be rejected at the third indexed position of the inspection head after the inspection station. The output connection would be made to the third bit position of the shift register 148. When the shift register has been clocked three times by the shift time multivibrator 384, a true signal is applied to the output line 386 of the shift register 148. This output is applied to a NAND gate 388 which is gated on and off by the output from the information shifting multivibrator 384. The output of the NAND gate 388 is applied to a monostable multivibrator 390 in the solenoid timing section 162 of the block diagram in FIG. 10. This multivibrator is also shown in FIG. 16 and is used to delay the activation of the solenoid timing multivibrator or one-shot 392 connected serially to it. The delayed activation allows the capsule just indexed into the reject position time to settle down before rejecting it if it has been judged defective.

The output of the second multivibrator 392 is DC coupled through a resistor 394 to the base of a reject transistor 396. The collector output of the transistor 396 is connected to one side of a coil 398. This coil 398, when energized, closes a normally open contact 400 which activates a triac 402. The triac 402 applies voltage to an air valve coil 404. This coil 404 controls the blast of air needed to blow a rejected capsule from its carrying rolls on the inspection head. There is no air valve needed to remove a capsule in the accept position, as this position is located subsequent to the rejection position so that any capsule reaching it is automatically removed by a continuously blowing air jet. The deposition of capsules at the accept position is also aided by the valve block 65 (FIG. 4) which removes the holding vacuum from the capsule receiving groove 54 at that position.

The accept and reject counters are identical. The accept counter 146 is representative and is shown in FIG. 17. The output signals from the accept counter NAND gate 330 are applied to a clamping circuit comprised of a resistor 406 and capacitor 408 connected in parallel. The output of this clamping circuit is DC coupled to the base electrode of a transistor 410 through a resistor 412.

The output of the transistor 410 is coupled to the base of a second transistor 416 through a parallel combination of a resistor 420 and capacitor 418. Proper DC biasing for these transistors 410 and 416 is obtained through four resistors 422, 424, 426 and 428.

The output from this two stage amplifier is taken from the collector of the second transistor 416 and applied to the clock input of a binary coded decimal counter 430. This counter 430 counts to nine before presenting a "carry" signal to the clock input of a second counter 431. In all, there are six counters connected together in this manner, each being clocked once for each carry signal received from a preceding counter.

Each of the counters 430 through 435 have their outputs coupled to a "BCD to decimal" decoder 436 through 441. These decoders 436 through 441 take the binarily coded decimal input from the counters 430 through 435 and transform it into a decimal number before applying the number to nixie tubes 442–447 for visual presentation of the counter contents. The nixie tubes 442 through 447 are connected to a D+ voltage supply through resistors 448.

It has been found advantageous due to the rapidity with which capsules are inspected to provide an alarm to warn the machine operator when a certain number of capsules have been inspected to permit him to change the receiving drums etc. This is done by taking the counter outputs of the four most heavily weighted counters 432 through 435 and applying those outputs to four BCD switches 450 through 453. may be done with all the counters be done with all the counters if desired, but it has been found unecessary to the so since the count of th last two counters 430 and 431 is insignificant difference together they only make a different of plus or minus one-hundred capsules.

The BCD switches 450 through 453 are set to the required number of capsules desired before initiating an alarm. When this count is reached by the counters 432 through 435 a true output appears on all of the switches 450 through 453 setting a conicident flip-flop 454. The output of this flip-flop 454 is coupled through a resistor 456 in a transistor 458 to a parallel combination of a diode 460 and relay coil 462. The other side of the diode 460 and relay coil 462 is connected to the C+ voltage supply. The relay coil 462, when activated, closes a normally open contact 464 to initiate the desired alarm or function. open contact 464 to initiate the desired alarm or function.

All of the counters 430 through 435 as well as the co-incident flip-flop 454 are reset by a two stage amplifier 466 identical to the two stage input amplifier described above. The reset amplifier 466 receives its input from a manually controlled push button on the front of the machine control panel.

The accept and reject counter inputs received from NAND'S 330 and 334 are also applied to a NAND 488 which sums the two signals. The summation signal from this NAND 488 and the reject count signal from the reject NAND 334 are used to obtain the ratio of capsules rejected with respect to the number of capsules inspected.

The rejected capsule ratio counter is shown in FIG. 18. The reject count pulses from NAND 334 are applied by a conductor 490 to a NAND gate 492. The total accept and reject count signals from the summation NAND gate 488 are applied by a conductor 494 to a second NAND 496 in the reject ratio section. The output of this second NAND 496 is used to clock the first stage 498 of a four place decade counter 500 which counts the total number of capsules inspected.

The input of a monostable multivibrator 502 is connected to the 2° output of the fourth stage 504 in the total inspected capsule counter 500. This input goes true as soon as the fourth stage 504 is clocked for the first time. The duration of the output 504 is clocked for the first time. The duration of the output pulse of this multivibrator 502 is determined by the RC time constant of a resistor 506 and capacitor 508.

The multivibrator 502 has two simultaneous outputs, one on conductor 510 and one on conductor 512. The top output, that on conductor 510, is a positive going pulse, while that on the bottom conductor 512 is a negative going pulse. These outputs control the ratio counter. The positive output on conductor 510 is applied to the reset inputs of the total accept and reject counter 500 as well as to a NAND gate 514. The gate 514 negates the positive pulse and applies the result to the reset inputs of a three stage counter 516. This three stage counter 516 counts the number of pulses which are presented to it by the reject number input NAND gate gate 492.

The negative pulse output from the multivibrator 502 on conductor 512 is concurrently applied to a NAND gate 518. The output of this NAND gate 518 is connected to the indicator strobe inputs of three bistable latches 520 through 522, each of which is connected to a corresponding stage 523–525 of the three stage reject counter 516. The outputs from these individual counters 523 through 525 are always present on the four lines connecting the counter stages with the bistable latches 520 through 522. Each of the output lines of the bistable latches 520 through 522 are set with a true or false signal to correspond with its associated input line when the latches 520–522 receive the leading edge of the multivibrator signal from the output of NAND gate 318.

The output lines of the bistable latches 520 through 522 are connected directly to BCD to decimal decoders 526 through 528. The decoders 526 through 528 take the binarily coded decimal input from the latches and change it to a decimal number for presentation to nixie tubes 529 through 531. These tubes are also connected through resistors 532 to the D+ voltage supply.

In operation, the total accept and reject counter 500 and the reject counter 516 continue to count until the former reaches a count of one thousand. This count initiates the action of the control multivibrator 502. The leading edge of the multivibrator output resets the total accept and reject counter 500 to zero and sets the number in the reject counter 516 into the binary latches 520 through 522. The trailing edge of the multivibrator output, due to its negation by the counter input NAND 514, resets the reject counter 516. This sequence of operations results in a visual display on the nixie tubes 529 through 531 of the percentage of capsules rejected per one thousand capsules inspected. This figure is updated or downdated every time a group of one thousand capsules is inspected.

It may be desired to notify the operator of the inspection device if the percentage of rejected capsules exceeds a certain level. This is done by the addition of a binary switch 534 whose input lines are connected by diodes 536 to the respective outputs of the second stage 524 of the reject counter 516. This stage 524 of the counter 516 corresponds to the tens digit of the number of rejects or the units digit of the percentage of rejects per one thousand capsules inspected. The BCD switch 534 is set for the predetermined numbers of rejects which is to be considered allowable. The switch output sets a flip-flop 538 when this level is exceeded.

The output of the flip-flop 538 is applied to a NAND gate 540 whose other input is obtained from a free running multivibrator 542. This multivibrator is comprised of two NAND gates 544 and 546 and a feed back resistor 548 and feedback capacitor 550. Preferably, this multivibrator has a frequency of approximately 10 to 20 Hertz. The output of the multivibrator gates the output of the NAND gate 540 on and off to give a flashing signal, assuming that the flip-flop 538 has been set by the BCD switch 534.

The output of the oscillatory NAND gate 540 is inverted or negated by a second NAND gate 552 and coupled to the base of a transistor 554 by a resistor 556. The collector output of the transistor 554 is applied to the coil 558 of an audio alarm or to a light bulb for activation in accordance with the pulsing of the multivibrator 542.

Various modifications and departures may be made within the scope of the invention in its broader aspects. For example, the optical detectors may be changed from photocells to a self scanning array of photo diodes whose outputs, for the most part, could be taken serially. For another example, built-in deviation signals may be discriminately identified by using a resettable and accurate timer instead of by oscillator controlled counters.

We claim:

1. An electronic system for inspecting medicinal capsules or the like containing one or more built-in deviations comprising means for optically scanning an area of a capsule containing one or more of said built-in deviations and which may contain one or more defects giving a similar signal response, and means for generating from such scanning an analog signal containing expected signal variations characteristic of said built-in deviations and occurring at predetermined times, and containing similar signal variations characteristic of capsule defects in the scanned area and occurring at other times, means for discriminating between signal variations caused by said built-in deviations and signal variations caused by defects, including detection means to detect the occurrence of signal variations at intervals shorter than the intervals between the predetermined times of occurrence of said expected variations, as an indication of the presence of a defect.

2. The electronic system for inspecting medicinal capsules or the like containing built-in deviations as claimed in claim 1 wherein said means for scanning an area of a capsule comprises means for spinning the capsule on its axis so as to effect redundant scanning of said area, and a light sensor for optically viewing the said area of the capsule.

3. The electronic system of claim 2 with the addition of means for successively indexing spinning capsules into and out of an inspection position.

4. The electronic system of claim 3 wherein said light sensor includes an array of self-scanning photo sensitive cells.

5. The electronic system of claim 3 wherein said light sensor includes a photo cell for observing the changes in reflected light from the scanned area of the capsule.

6. The electronic system of claim 5 wherein said means for discriminating includes means to convert said variations into digital signals.

7. The electronic system of claim 6 wherein said means to convert said variations into digital signals includes means to disregard any of said variations which are below a predetermined amplitude level.

8. The electronic system of claim 6 wherein said means for discriminating further comprises an oscillator and means to compare the number of output oscillations from said oscillator occurring during said predetermined interval with the number of said oscillations occurring between any two of said signal variations.

9. The electronic system of claim 8 wherein said means to compare the number of output oscillations comprises a counter coupled to said oscillator and to said digital signals for counting the number of oscillations originating from said oscillator and for being reset when one of said digital signals occur, and logic switch means coupled to the output of said counter and set at a predetermined number corresponding to the number of said oscillations occurring during said predetermined interval, the output of said logic switch means indicating whether or not said counter has received a sufficient number of said oscillations to equal said predetermined number before being reset by one of said digital signals.

10. The electronic system of claim 9 including means for controlling the selective rejection of the capsule being inspected in accordance with the output of said logic switch means.

11. The electronic system of claim 10, wherein said means for controlling the selective rejection of a capsule includes means for effecting the rejection of a capsule after the inspected capsule has been indexed to a preselected subsequent index station.

12. The electronic system of claim 11 wherein said means for effecting the rejection of a capsule comprises a shift register.

13. The electronic system of claim 10 including a counter for counting the number of capsules thereby rejected, and a second counter for counting the number of capsules not thereby rejected.

14. The electronic system of claim 10 including means for synchronizing the movement of said means for successively indexing capsules with the operation of said means for controlling the selective rejection of the capsule being inspected.

15. The electronic system of claim 13 with the addition of means for the presentation of the percentage of capsules rejected out of the total number of capsules inspected.

16. The electronic system of claim 15 including warning means for generating a signal upon said percentage exceeding a predetermined level.

17. The electronic system of claim 14 wherein said means for the presentation of the percentage of capsules not rejected comprises,
a first counter for counting the total number of capsules inspected,
a second counter for counting the number of capsules not rejected,
control means for stopping said second counter upon the contents of said first counter reaching a preselected count level, and for concurrently displaying the contents of said second counter.

18. The electronic system of claim 10 including means for synchronizing the movement of said means for successively indexing capsules with the operation of said means for controlling the slective rejection of the capsule being inspected.

19. The electronic system of claim 8 wherein said oscillator is a crystal controlled oscillator.

20. The electronic system of claim 1 wherein said means for discriminating includes triggering means for initiating operation of said detection means when a signal variation first occurs.

21. An electronic system for inspecting medicinal capsules or the like containing one or more built-in deviations comprising
means for optically scanning areas of a capsule and for generating from such scanning a plurality of analog signals containing signal variations characteristic of said built-in deviations which may contain similar signal variations characteristic of capsule defects in the scanned areas, means for discriminating between signal variations caused by said built-in deviations and occurring at predetermined intervals and signal variations caused by defects and occurring at other times, including means to detect the occurrence of signal variations at intervals shorter than said predetermined intervals as a first indication of the presence of a defect, and means for detecting variations occurring in signals from areas having none of said built-in deviations and means for using such detected variations as a second indication of the presence of a defect.

22. The electronic system of claim 21 including means for logically summing said first and second indications, and a rejection control coupled to said summing means for effecting the selective rejection of the capsule being inspected in accordance with the logical sum of said first and second indications.

23. The electronic system of claim 22 which further comprises display means for storing and displaying the number of rejected capsules.

24. The electronic system of claim 22 which further comprises means for presenting the numerical representation of the percentage of capsules rejected with respect to the total number of capsules inspected during a predetermined interval.

25. The electronic system of claim 22 wherein said means for scanning areas of a capsule includes means for spinning a capsule, a plurality of light sensors for repeatedly observing respective areas of the spinning capsule and for generating a plurality of analog signals containing redundant variations.

26. The electronic system of claim 25, including means for ignoring any of said first and second indications until the generation of a signal variation.

27. The electronic system of claim 22 which further comprises means for presenting the numerical representation of the percentage of capsules not rejected with respect to the total number of capsules inspected during a predetermined interval.

28. The electronic system of claim 21 wherein said means for scanning areas of a capsule includes means for spinning the capsule on its axis so as to effect redundant scanning of said areas, and a light sensor for optically viewing said areas of the capsule.

29. The electronic system of claim 21 wherein said means for discriminating includes triggering means for initiating operation of said means to detect when a signal variation first occurs.

30. An electronic system for inspecting rapidly presented and rotated medicinal capsules having one or more built-in deviations comprising, a photo detector for generating one or more analog signals containing variations representative of defects and built-in deviations on a capsule, analog to digital converter means for converting said analog signals to signals comprised of digital pulses corresponding to said built-in deviations and defects, means to distinguish between said digital pulses corresponding to defects and said digital pulses corresponding to built-in deviations, and rejection means selectively operated in accordance with said distinguishing means for rejecting a capsule when a digital pulse corresponding to a defect has occurred.

31. The electronic system of claim 30 which further comprises a reject counter for storing the number of capsules rejected.

32. The electronic system of claim 30 which further comprises a not rejected counter for storing the number of capsules inspected but not rejected.

33. A method of electronically inspecting medicinal capsules having one or more built-in deviations, which comprises the steps of repeatedly scanning the surface of a capsule, generating an analog signal characteristic of both the said built-in deviations and any capsule defects, and having variations in accordance with said built-in deviations and said defects, discriminating between said analog signal variations corresponding to said built-in deviations and those corresponding to said defects, storing the number of signal variations corresponding to said defects, comparing said number of signal variations corresponding to said defects with a preselected minimum number of allowable variations, and rejecting the capsule if said minimum number is less than or equal to said number of variations corresponding to said defects.

34. The method of claim 33 wherein said discriminating steps comprises the steps of converting said variations in said analog signal to digital signals, counting output oscillations of an oscillator with a controllable counter, resetting said controllable counter to a zero count with said digital signals, comparing the count attained by said counter with a predetermined count when a digital signal corresponding to one of said deviations occurs, said predetermined count corresponding to the number of said oscillations expected to occur between the occurrence of said digital signals corresponding to said built-in deviations, and signaling that a defect exists in said capsule if the count attained by said counter is less than said predetermined count at the time of comparison.

35. The method of claim 34 which further comprises the step of counting the number of rejected capsules.

36. The method of claim 34 which further comprises the steps of counting the number of rejected capsules, counting the number of capsules thereby inspected, and presenting the percentage of capsules rejected out of a predetermined number of capsules inspected.

37. The method of calim 33 wherein said repeatedly scanning step comprises the steps of spinning a capsule for a plurality of times in an inspection position, and observing areas of the spinning capsule with a plurality of light sensors.

38. An electronic system for inspecting medicinal capsules or the like, comprising means for optically scanning an area of a capsule; means for generating from such scanning an analog signal containing variations characteristic of capsule defects in said scanned area; means for processing said signal and said signal variations, rejection means responsive to said processing means for rejecting a capsule having a defect in said scanned area; first counting means for counting the number of capsules thereby rejected or the number of capsules thereby not rejected; and calculation means for calculating and presenting the percentage of the capsules rejected or not rejected with respect to a predetermined number of capsules which are inspected.

39. The electronic system of claim 38 wherein said calculation means comprises a second counting means for counting the number of capsules which are inspected, control means responsive to said second counting means, display means for displaying said percentage, said control means including means for detecting when said second counting means has counted said predetermined number of inspected capsules and for presenting the count reached by said first counting means to said display means when said predetermined number has been counted by said second counter.

* * * * *

UNITED STATES PATENT OFFICE
CERTIFICATE OF CORRECTION

Patent No. 3,757,943      Dated September 11, 1973

Inventor(s) Hi Chul Chae, Richard Gelinas, Jon Caton Trusty, and Walter H. Berntsen It is certified that error appears in the above-identified patent and that said Letters Patent are hereby corrected as shown below:

In the Specification

Col. 1, line 13, change "consists" to --consist--;
Col. 3, line 21, change "ight" to --light--;
Col. 5, line 1, change "38. An" to --Fig.--;
Col. 9, line 3, after the number "136", add --and 138--;
Col. 9, line 23, change "for four" to --of four--;
Col. 10, line 49, change "ampliifer" to --amplifier--;
Col. 10, lines 57 and 58, change "supplied" to --applied--;
Col. 10, line 62, change "the" to --that--;
Col. 12, line 14, change "+2" to --+2$^2$--;
Col. 14, line 41, leave out the second "controls";
Col. 14, line 41, change "of a Its" to --of a capsule --;
Col. 15, line 56, change "th" to --the--;
Col. 17, line 11, change "453.may" to --453. This may--;
Col. 17, line 12, leave out the last six words "be done with all the counters";
Col. 17, line 13, change "unecessary" to --unnecessary--;
Col. 17, line 13, change "to the so" to --to do so--;
Col. 17, line 14, change "th" to --the--;
Col. 17, line 15, change "difference" to --since--;
Col. 17, lines 15 & 16, change "different" to --difference--;
Col. 17, line 21, change "conicident" to --coincident--;
Col. 17, line 28, omit entire line after the word "function";
Col. 17, line 29, omit entire line;
Col. 17, lines 56 and 57, leave out "The duration of the output 504 is clocked for the first time";
Col. 17, line 67, change "The gate" to --The NAND gate--;
Col. 18, line 5, omit second "gate".

UNITED STATES PATENT OFFICE
CERTIFICATE OF CORRECTION

Patent No. 3,757,943     Dated September 11, 1973

Inventor(s) Hi Chul Chae, Richard Gelinas, Jon Caton Trusty, and Walter H. Berntsen It is certified that error appears in the above-identified patent and that said Letters Patent are hereby corrected as shown below:

In the Claims

Cancel claim 14.

Renumber claim 15 as claim 14.

Add claim 15 as follows:

--15. The electronic system of claim 14 wherein said means for the presentation of the percentage of capsules rejected comprises, a first counter for counting the total number of capsules inspected, a second counter for counting the number of capsules rejected, control means for stopping said second counter upon the contents of said first counter reaching a preselected count level, and for concurrently displaying the contents of said counter.--

Signed and sealed this 7th day of January 1975.

(SEAL)
Attest:

McCOY M. GIBSON JR.
Attesting Officer

C. MARSHALL DANN
Commissioner of Patents